United States Patent

Mizushima et al.

[11] Patent Number: 5,844,739
[45] Date of Patent: Dec. 1, 1998

[54] METHOD AND APPARATUS FOR RECORDING AND REPRODUCING DIGITAL DATA

[75] Inventors: Tetsuya Mizushima, Yawata; Akira Iketani, Higashiosaka; Tatsuro Juri, Osaka, all of Japan

[73] Assignee: Matsushita Electric Industrial Co., Ltd., Osaka-fu, Japan

[21] Appl. No.: 854,802

[22] Filed: May 12, 1997

Related U.S. Application Data

[63] Continuation of Ser. No. 566,276, Dec. 1, 1995, abandoned, which is a continuation of Ser. No. 278,093, Jul. 21, 1994, abandoned.

[30] Foreign Application Priority Data

Jul. 23, 1993 [JP] Japan ................................ 5-182584
Jun. 1, 1994 [JP] Japan ................................ 6-120183

[51] Int. Cl.⁶ .................................................. G11B 5/09
[52] U.S. Cl. ............................. 360/48; 360/47; 360/61; 360/18; 386/104
[58] Field of Search ................................ 360/18, 19.1, 27, 360/32, 48, 61, 47; 358/335, 343; 386/104, 124, 131, 96, 46, 97

[56] References Cited

U.S. PATENT DOCUMENTS

| | | | |
|---|---|---|---|
| 4,914,527 | 4/1990 | Asai et al. | 360/19.1 |
| 5,200,943 | 4/1993 | Sano et al. | 369/48 |
| 5,327,300 | 7/1994 | Satomura | 360/61 |
| 5,396,374 | 3/1995 | Kubota et al. | 360/19.1 |
| 5,434,673 | 7/1995 | Inoue et al. | 360/32 |
| 5,583,654 | 12/1996 | Oguro | 386/96 |
| 5,655,050 | 8/1997 | Yamamoto et al. | |

FOREIGN PATENT DOCUMENTS

| | | |
|---|---|---|
| 0421871 | 4/1991 | European Pat. Off. . |
| 0553817 | 8/1993 | European Pat. Off. . |
| 0600467 | 6/1994 | European Pat. Off. . |

OTHER PUBLICATIONS

"7th Draft Proposed American National Standard Helical–Scan Digital Computer Tape Cartridge 3.81mm (0.150in) Data/Dat Recorded Format for Information Interchange", 1 Nov. 1990.
"8th Draft (Revised) Proposed American National Standard Helical–Scan Digital Computer Tape Cartridge 3.81mm (0.150in) Digital Data Storage (DDS) Recorded Format for Information Interchange",5 Dec., 1990.
M. Liebhold et al. "Toward an Open Environment for Digital Video," Communications of the Association for Computing Machinery, vol. 34, No. 4, pp. 103–112, Apr. 1, 1991.
One European Search Report, dated Oct. 30, 1996, for European Application No. 94111472.0.

*Primary Examiner*—Aristotelis M. Psitos
*Assistant Examiner*—Alan Faber
*Attorney, Agent, or Firm*—Greenblum & Bernstein, P.L.C.

[57] ABSTRACT

A digital data recording apparatus records digital data in tracks on a tape. Each track has a first signal area for storing track format information and a second signal area for storing a plurality of sync blocks. The apparatus includes a circuit for inserting, in the first signal area, regular TDS information indicating the track data structure of digital data, and a circuit for inserting, in the final sync block, backup TDS information having the same structure as the regular TDS information.

27 Claims, 18 Drawing Sheets

METHOD AND APPARATUS FOR RECORDING AND REPRODUCING DIGITAL DATA

This application is a continuation, of application Ser. No. 08/566,276, filed Dec. 1, 1995, now abandoned, which is a continuation of 08/278,093, filed Jul. 21, 1994, now abandoned.

BACKGROUND OF THE INENTION

1. Field of the Invention

The present invention relates to method and apparatus for recording and reproducing digital data.

2. Description of the Prior Art

A digital data recording/reproducing technique has been widely spread in various fields, and remarkable and rapid progress has been made in a digital AV field. Digital video tape recorders of D1 and D2 formats (SMPTE standard) using rotary heads have been put in practical use for business purposes, and rotary digital audio tape recorders (RDAT) have also reached the stage of practical use. Moreover, an application of the technique to data streamers or the like is under consideration. ("7th Draft PROPOSED AMERICAN NATIONAL STANDARD HELICAL-SCAN DIGITAL COMPUTER TAPE CARTRIDGE 3.81 mm(0.150 in) DATA/DAT RECORDED FORMAT FOR INFORMATION INTERCHANGE" Nov. 1, 1990, "7th Draft PROPOSED AMERICAN NATIONAL STANDARD HELICAL-SCAN DIGITAL COMPUTER TAPE CARTRIDGE 3.81 mm(0.150 in) DIGITAL DATA STORAGE (DDS) RECORD FORMAT FOR INFORMATION INTERCHANGE" Apr. 9, 1990).

A TDS (track data structure) information indicating the structure of data recorded in tracks for the data streamer referred to above is the same as that for audio recording, but the content of the data thereinside is different. Due to the fixed structure of data in the recording track in the data streamer, however, it is impossible to make recording in the structure of tracks fit for a to-be-recorded data.

According to another conventional arrangement information showing the structure of the digital data is recorded in a particular area in each track. In this arrangement, only the signal area including the information showing the structure of the digital data is set in the same format, while the structure of the other data is made in conformity with the information showing the structure of the digital data of the recording track. This recording method enables recording of data in the structure of tracks fit for the to-be-recorded data.

The signal area including the information showing the structure of the digital data in the recording track is defined as an ITI area. The structure of the data in the track and the content of the data can be recognized by detecting the ITI area at the reproducing time, and therefore, data of a different system is prevented from being erroneously reproduced and a plurality of recording patterns of different formats can be normally reproduced. In the above prior art, the ITI area cannot be correctly detected if it includes a damage, such as a scratch, in the running direction of the tape, whereby the TDS information indicating the structure of the digital data in the track and the content of the digital data are turned not recognizable, imposing a serious problem on a data recording apparatus.

SUMMRY OF THE IVENTION

The object of the present invention is therefore to simplify an apparatus and improve the demodulating efficiency of a subcode data by recording a recording area of an input data including a retrieval information, a date information, etc. of the data into the same track as the other recording areas. A digital data recording apparatus of the present invention is adapted to make a TDS information indicating the structure of a digital data included in a second signal area in addition to a first signal area, so that the structure and the content of the data in the track can be normally recognized through the detection of a synchronous block including the information of the structure of the digital data of the track in the second signal area even if the first signal area is impossible to normally detect because of a damage of a tape in the running direction.

A first method invention is a method for recording digital data on a recording medium, which is a tape, in a form of tracks aligned parallelly on the recording medium. Each track has a first signal area for storing track format information and a second signal area for storing a plurality of sync blocks. The first method invention comprises the steps of: inserting in the first signal area a regular TDS information indicating the structure of digital data; and inserting in a predetermined sync block a backup TDS information having the same structure as the regular TDS information.

A second method invention is a method for reproducing digital data from a recording medium by reading tracks from the recording medium. Each track has a first signal area inserted with a regular TDS information indicating the structure of digital data and a second signal area carrying a plurality of sync blocks and a backup TDS information having the same structure as the regular TDS information inserted in a predetermined sync block. The second method invention comprises the steps of: detecting the regular TDS information from the first signal area; detecting the backup TDS information from the second signal area; selecting the regular TDS information when the regular TDS information is detected; and selecting the backup TDS information when the regular TDS information is not detected.

A first apparatus invention is an apparatus for recording digital data on a recording medium in a form of tracks aligned parallelly on the recording medium. Each track has a first signal area for storing track format information and a second signal area for storing a plurality of sync blocks. The first apparatus invention comprises: first inserting means for inserting in the first signal area a regular TDS information indicating the structure of digital data; and second inserting means for inserting in a predetermined sync block a backup TDS information having the same structure as the regular TDS information.

A second apparatus invention is an apparatus for reproducing digital data from a recording medium by reading tracks from the recording medium. Each track has a first signal area inserted with a regular TDS information indicating the structure of digital data and a second signal area carrying a plurality of sync blocks and a backup TDS information having the same structure as the regular TDS information inserted in a predetermined sync block. The second apparatus invention comprises: first detecting means for detecting the regular TDS information from the first signal area; second detecting means for detecting the backup TDS information from the second signal area; selecting means for selecting the regular TDS information when the regular TDS information is detected, and selecting the backup TDS information when the regular TDS information is not detected.

BRIEF DESCRPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 1 is a diagram of a track pattern of a digital VCR in an embodiment of the present invention;

FIGS. 2A and 2B comprise diagrams of a synchronous block of a subcode area of the digital VCR in FIG. 1;

FIG. 3 is a diagram of a track pattern of a data streamer in one embodiment of the present invention;

FIGS. 4A and 4B comprise diagrams of a synchronous block of a subcode area of the data streamer in FIG. 3;

FIGS. 5A and 5B comprise diagrams of ID codes according to the present invention;

DETAILED DESCRIPTION OF PREFERRED EMOBODIMENTS

With reference to the accompanying drawings, preferred embodiments of the present invention will be described hereinbelow using an example of a digital signal recording/reproducing apparatus which records/reproduces digital signals on slantwise tracks of a tape by means of two heads mounted on a cylinder. The present invention is applicable to both the digital VCR and the data streamer.

Figure 1:
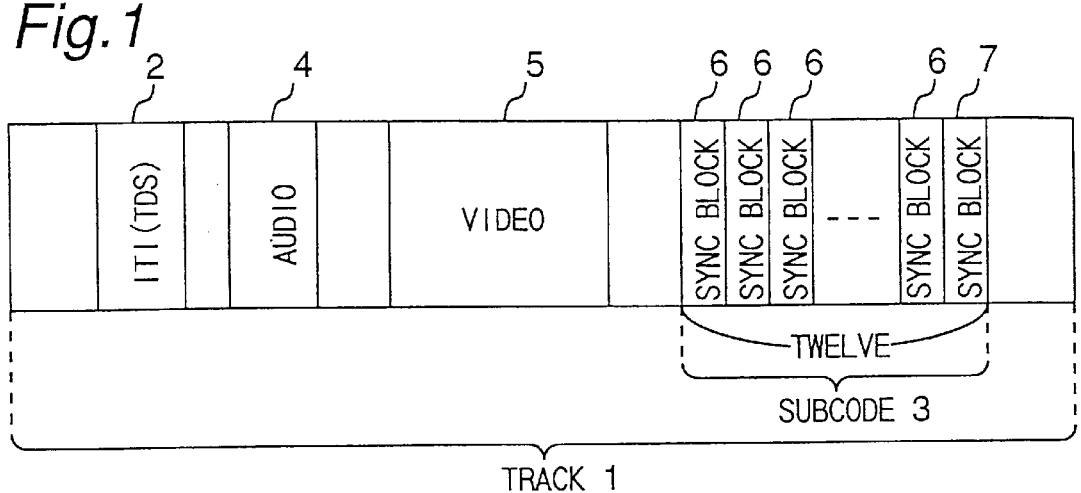

Referring to FIG. 1 an example of the structure of a recording track for use in a digital VCR, according to the present invention, is shown. As is clear from FIG. 1, a track 1 consists of an ITI area 2 carrying TDS information indicative of the track data structure, a subcode area 3 carrying date data for identifying day and time, and search data for searching the content recorded in the tape, etc., an audio area 4 carrying audio signals, and a video area 5 carrying video signals. The subcode area 3 includes twelve consecutive synchronous blocks 6, 7, in which synchronous block 7 is the last synchronous block. The synchronous blocks 6 are referred to as non-final sync blocks and the synchronous block 7 is referred to as a final sync block, which are shown in FIGS. 2A and 2B, respectively.

Figure 2A:
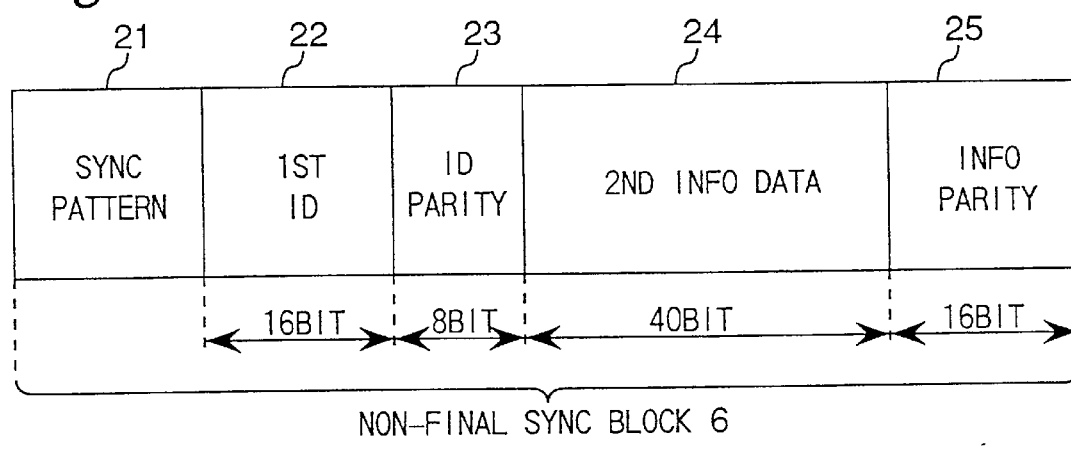

Referring to FIG. 2A, the non-final sync block 6 is shown. Each of the non-final sync block 6 has: a sync pattern 21 which indicates a starting point of each sync block and distinguishes the subcode area 3 from the other signal areas; a 16-bit first ID code 22 containing a first information data, such as tag data and subcode identification data, a portion of the search data and a sync block order data indicative of one of the first to eleventh sync block; an 8-bit ID parity 23 for detecting and correcting errors in first ID code 22; a 40-bit data area 24 containing a second information data; and a 16-bit information data parity 25 for detecting and correcting errors of the second information data.

Figure 2B:
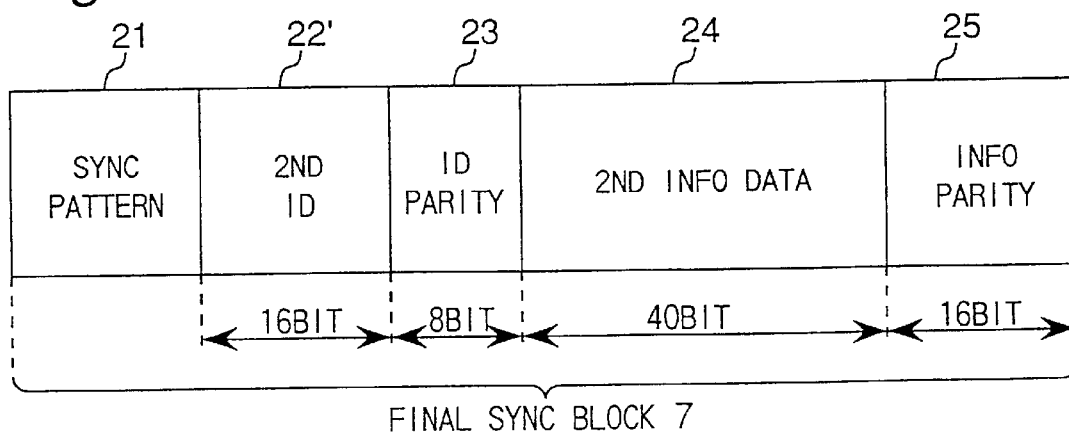

Referring to FIG. 2B, the final sync block 7 is shown. The final sync block 7 has a similar structure to that of the non-final sync block 6, but differs in that, instead of the 16-bit first ID code 22, the final sync block 7 has a 16-bit second ID code 22'. The second ID code 22' contains the TDS information indicative of the track data structure, which is the same as the TDS information stored in the ITI area 2, and a sync block order data indicative of the twelfth sync block.

Figure 3:
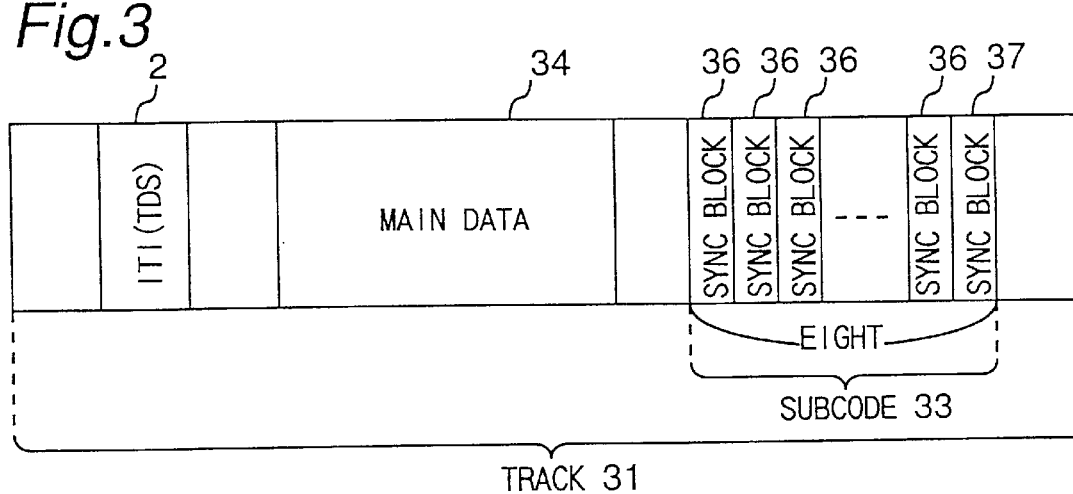

Referring to FIG. 3, an example of the structure of a recording track for use in a data streamer, according to the present invention, is shown. As indicated in FIG. 3, a track 31 has the ITI area 2 including the TDS information indicative of the structure of the data in the track, a subcode area 33 carrying date data for identifying day and time and search data for searching the content recorded in the tape, etc., and a main data area 34 for storing a main data. The subcode area 33 includes eight consecutive sync blocks 36, 37, in which sync block 37 is the last sync block. The sync blocks 36 are referred to as non-final sync blocks and the sync block 37 is referred to as a final sync block, which are shown in FIGS. 4A and 4B, respectively.

Figure 4A:
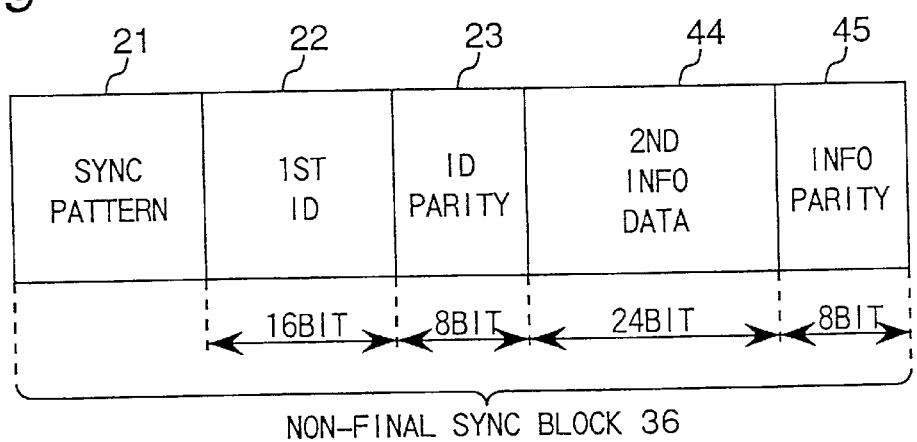

Referring to FIG. 4A, the non-final sync block 36 is shown. Each of the non-final sync block 36 has: a sync pattern 21 which indicates a starting point of each sync block and distinguishes the subcode area 33 from the other signal areas; a 16-bit first ID code 22 containing a first information data, such as tag data and subcode identification data, a portion of the search data and a sync block order data indicative of one of the first to seventh sync block; an 8-bit ID parity 23 for detecting and correcting errors in first ID code 22; a 24-bit data area 44 containing a second information data; and an 8-bit information data parity 45 for detecting and correcting errors of the second information data.

Figure 4B:
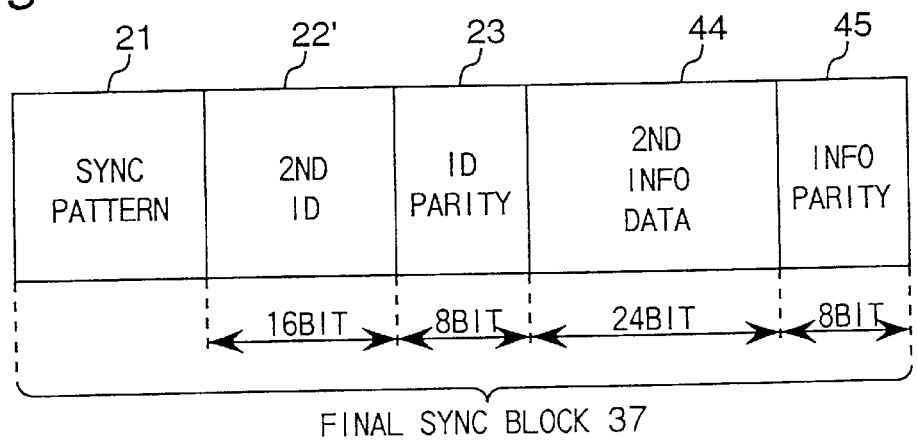

Referring to FIG. 4B, the final sync-block 37 is shown. The final sync block 37 has a similar structure to that of the non-final sync block 66, but differs in that, instead of the 16-bit first ID code 22, the final sync block 37 has a 16-bit second ID code 22'. The second ID code 22' contains the TDS information indicative of the track data structure, which is the same as the TDS information stored in the ITI area 2, and a sync block order data indicative of the eighth sync block.

It is noted that the ITI area 2 of track 1 (FIG. 1) for the digital VCR and the ITI area 2 of track 31 (FIG. 3) for the data streamer have the same structure. Furthermore, the length and the number of sync blocks are different between the subcode area 3 for the digital VCR and the subcode area 33 for the data streamer, the synchronous pattern 21, the ID code 22 and the ID parity 23 are formed in the same structure between the digital VCR format and the data streamer format.

Figure 5A:
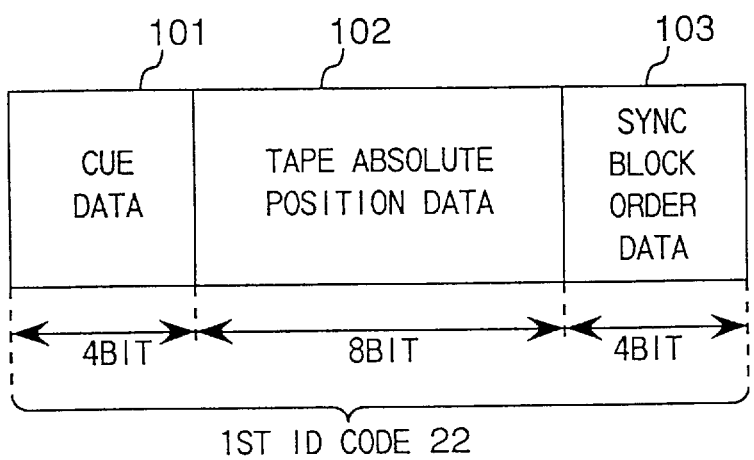

Referring to FIG. 5A, the first ID code 22 is shown. The first ID code 22 has three different data which are: a 4-bit cue data 101 for searching; an 8-bit tape absolute position data 102; and a 4-bit sync block order data 103 indicating one of the first to Mth sync block, in which M is eleven for the digital VCR format, and M is seven for the data streamer format.

Figure 5B:
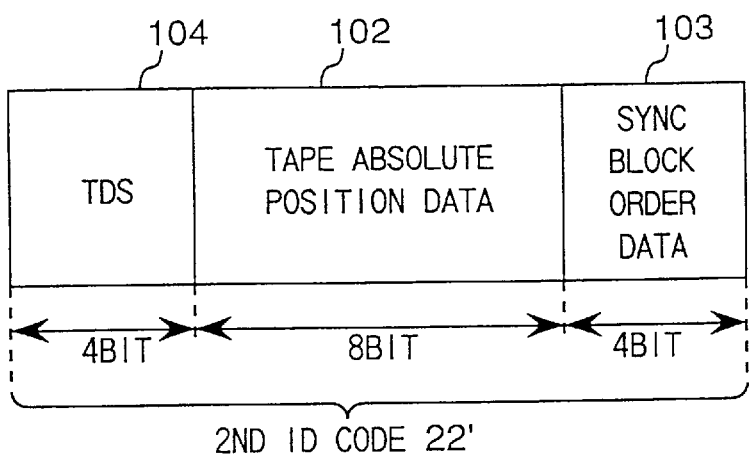

Referring to FIG. 5B, the second ID code 22' is shown. The second ID code 22' also has three different data, in which the second and the third data are the same as those in the first ID code 22, but the first data is different. More specifically, the first data in the second ID code 22' is a 4-bit TDS information 104 indicative of the structure of the data in the track, and this is the same data stored in the ITI area 2 in each track. In the second ID code 22', the third data is the 4-bit sync block order data 103 indicating final Nth sync block, in which N is twelve for the digital VCR format, and N is eight for the data streamer format.

Figure 6:
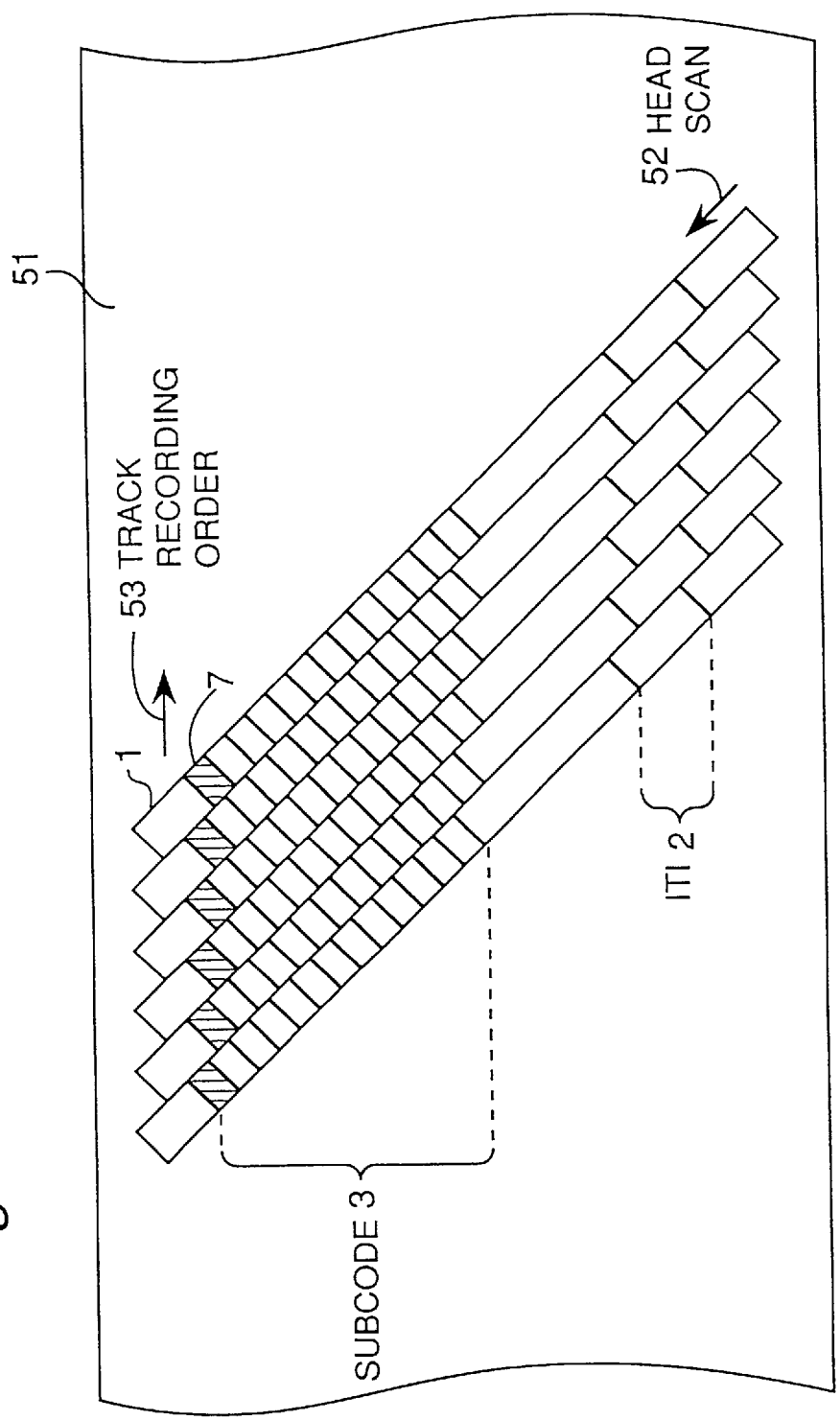
FIG. 6 is a diagram of a tape pattern in the digital VCR in FIG. 1.
Figure 7:
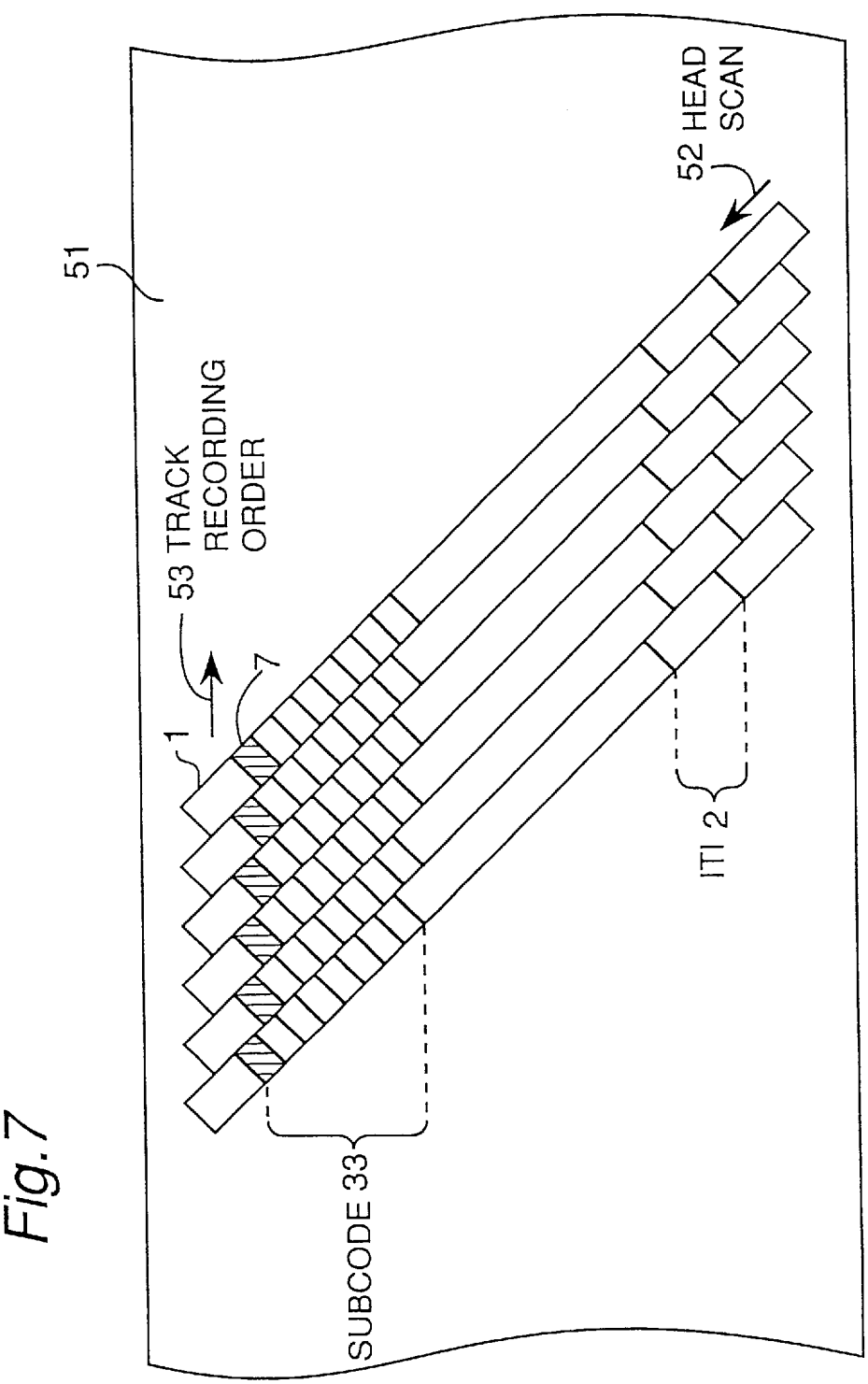
FIG. 7 is a diagram of a tape pattern in the data streamer in FIG. 3.

FIG. 6 shows a track pattern on the tape in the digital VCR format, and FIG. 7 shows a track pattern on the tape in the data streamer format. In FIGS. 6 and 7, reference number 51 is a tape, 52 is the scanning direction of heads, and 53 is the recording order of the tracks. The audio signal area 4 and video signal area 5 for the digital VCR format, and the main data area 34 for the data streamer format are omitted from both track patterns in FIGS. 6 and 7.

Below, the digital data recording apparatus for recording the pattern of the digital VCR will be described in connection with FIGS. 8–11, and the digital data recording is apparatus for recording the pattern of the data streamer shown in FIG. 7 will be described in connection with FIGS. 17–20.

Also, the digital data reproducing apparatus for reproducing either one or both of the digital VCR and data streamer.

Figure 8:
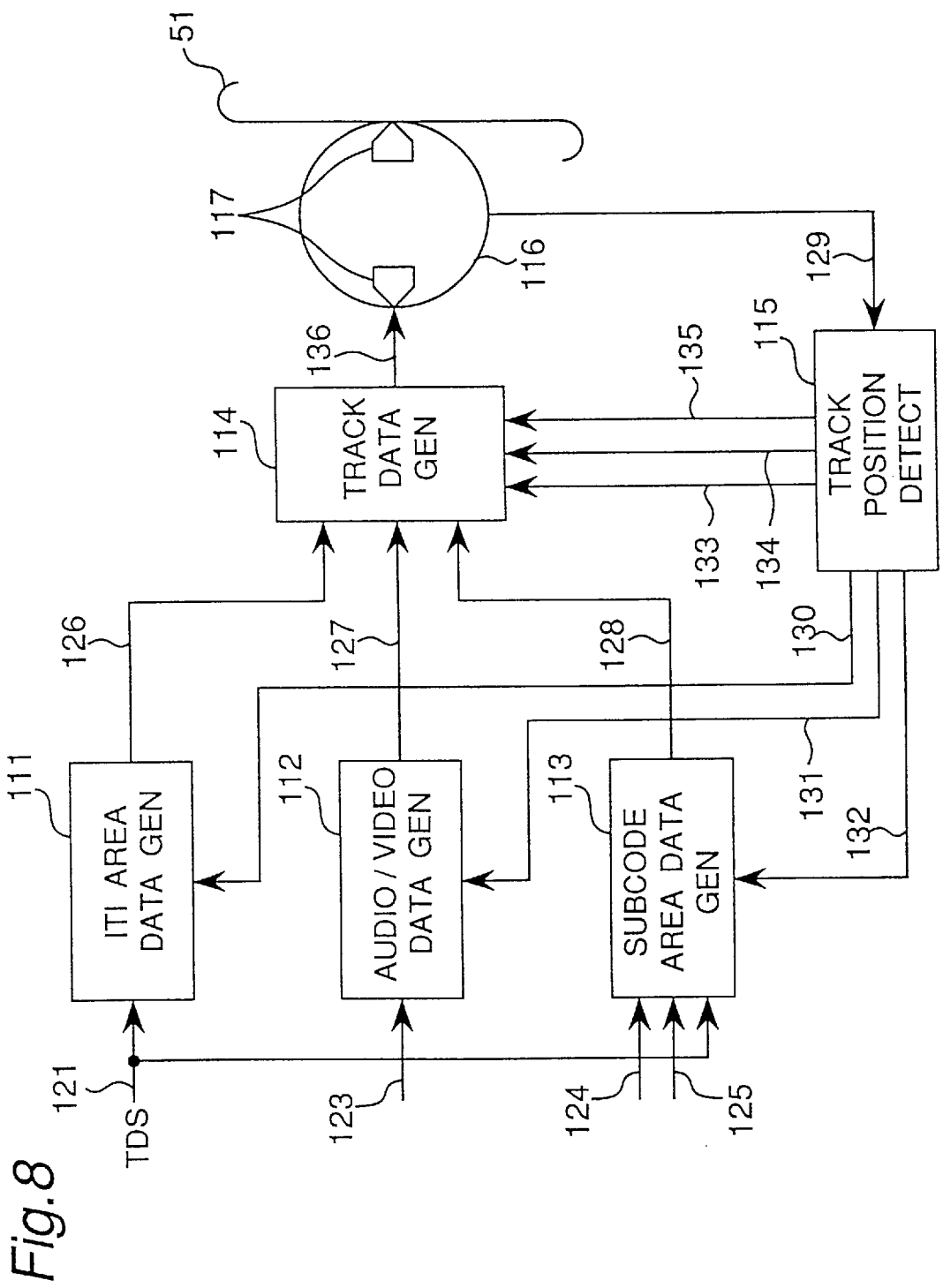
FIG. 8 is a recording apparatus of the digital VCR in the embodiment of FIG. 1.
Figure 9:
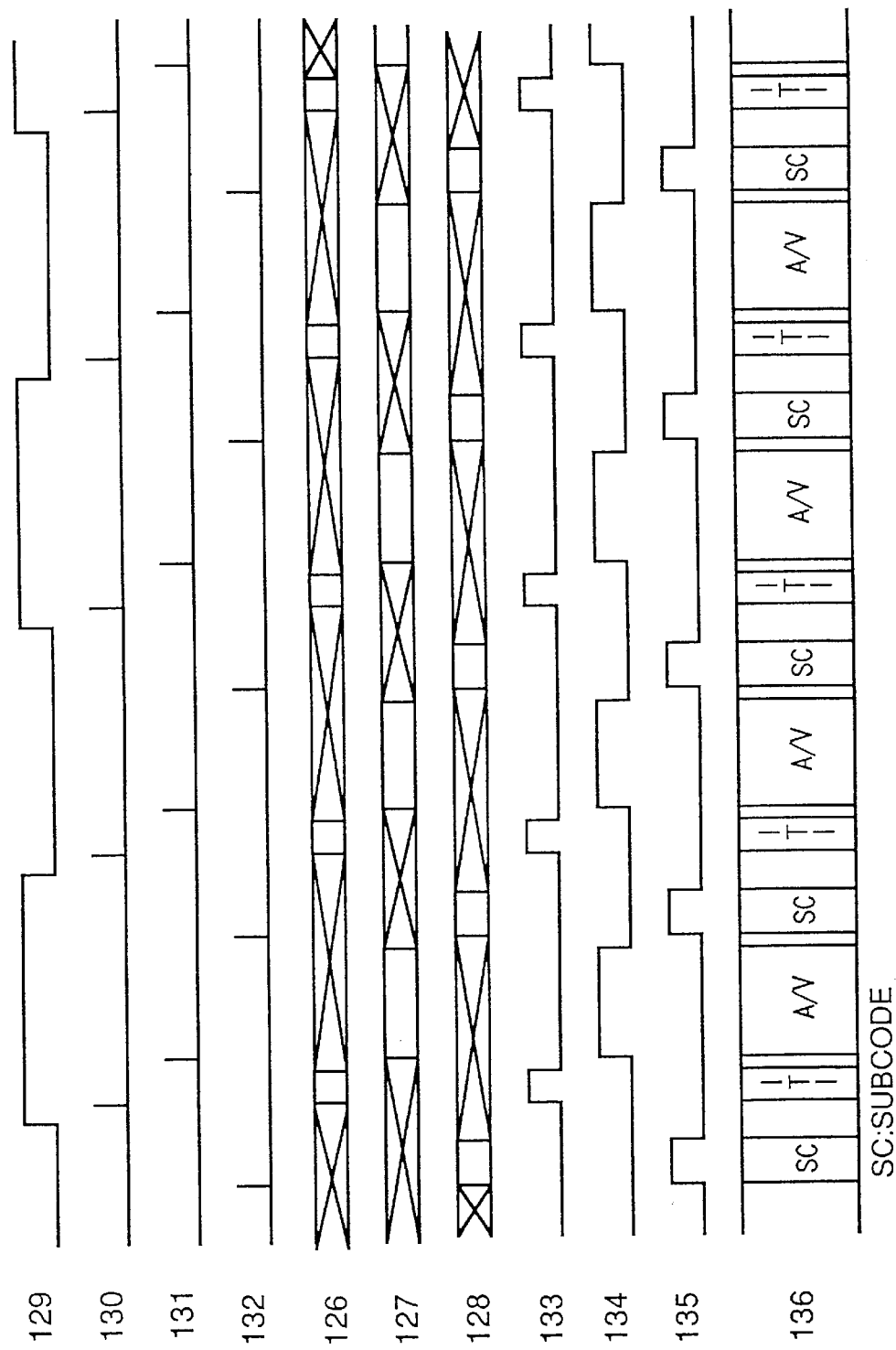
FIG. 9 is a timing chart of the operation of the recording apparatus of FIG. 8.

The digital data recording/reproducing apparatus which operates under the use of the digital VCR format of FIG. 6 is shown in FIG. 8, and its operation is shown in FIG. 9.

Referring to FIGS. 8 and 9, a track position detector 115 instructs the timing for generating and inserting data in the track in accordance with a head position signal 129 indicating the position of the heads 117 mounted on the cylinder. The head position signal 129 is a toggle signal inverted to 0 from 1 or 1 from 0 when the head comes to a starting point of the track.

Produced from the track position detector. 115 are an ITI trigger signal 130 indicating the timing to generate an ITI area data 126, an audio/video trigger signal 131 instructing the timing to generate an audio area/video area data 127, and a subcode trigger signal 132 indicating the timing to generate a subcode area data 128. Also produced from detector 115 are control signals 133, 134, 135 which are fed to a track data generator 114 to select one of ITI area data 126, audio area/video area data 127 and subcode area data 128 to form a track signal 136.

An ITI area data generator 111 generates in response to ITI trigger signal 130, the ITI area data 126 based on TDS information 121 indicative of the structure of the data in the track. An audio area/video area data generator 112 generates in response to the audio/video trigger signal 131, the audio area/video area data 127 based on an audio signal/video signal 123. A subcode area data generator 113 generates, in response to the subcode trigger signal 132, the subcode area data 128 based on TDS information 121, composite information 124 including the cue data and the absolute position of the tape, and date information 125 including searching code and date information of the recording content.

A rotary cylinder 116 has two recording/reproducing heads 117 positioned 180° opposite to each other. The track signal 136 from the track data generator 114 is recorded onto the tape 51 by the recording/reproducing heads 117.

The subcode area data generator 113 will be discussed more in detail with reference to FIGS. 10 and 11.

Figure 10:
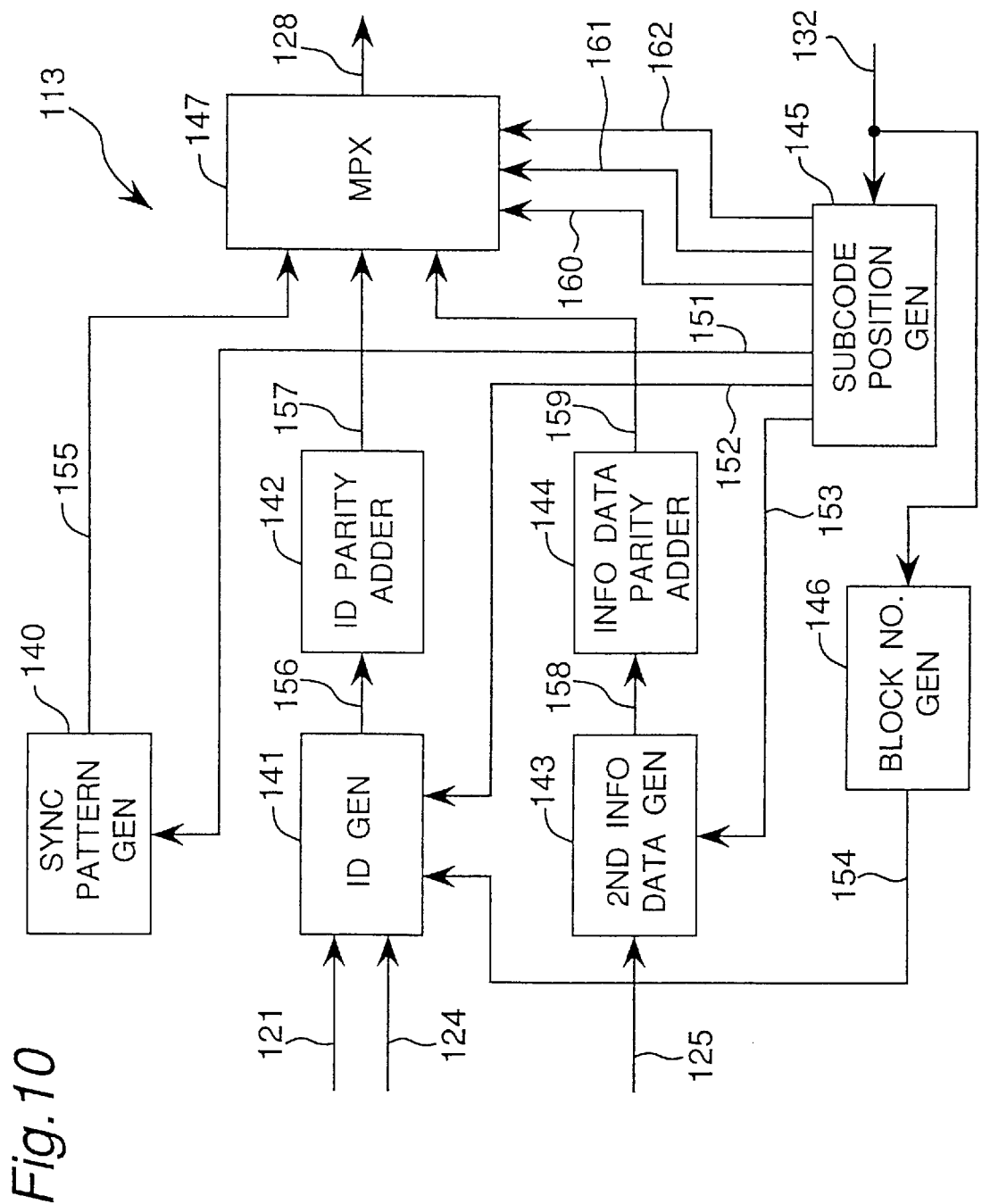
FIG. 10 is a circuit diagram of a subcode area generator of the recording apparatus of FIG. 8.
Figure 11:
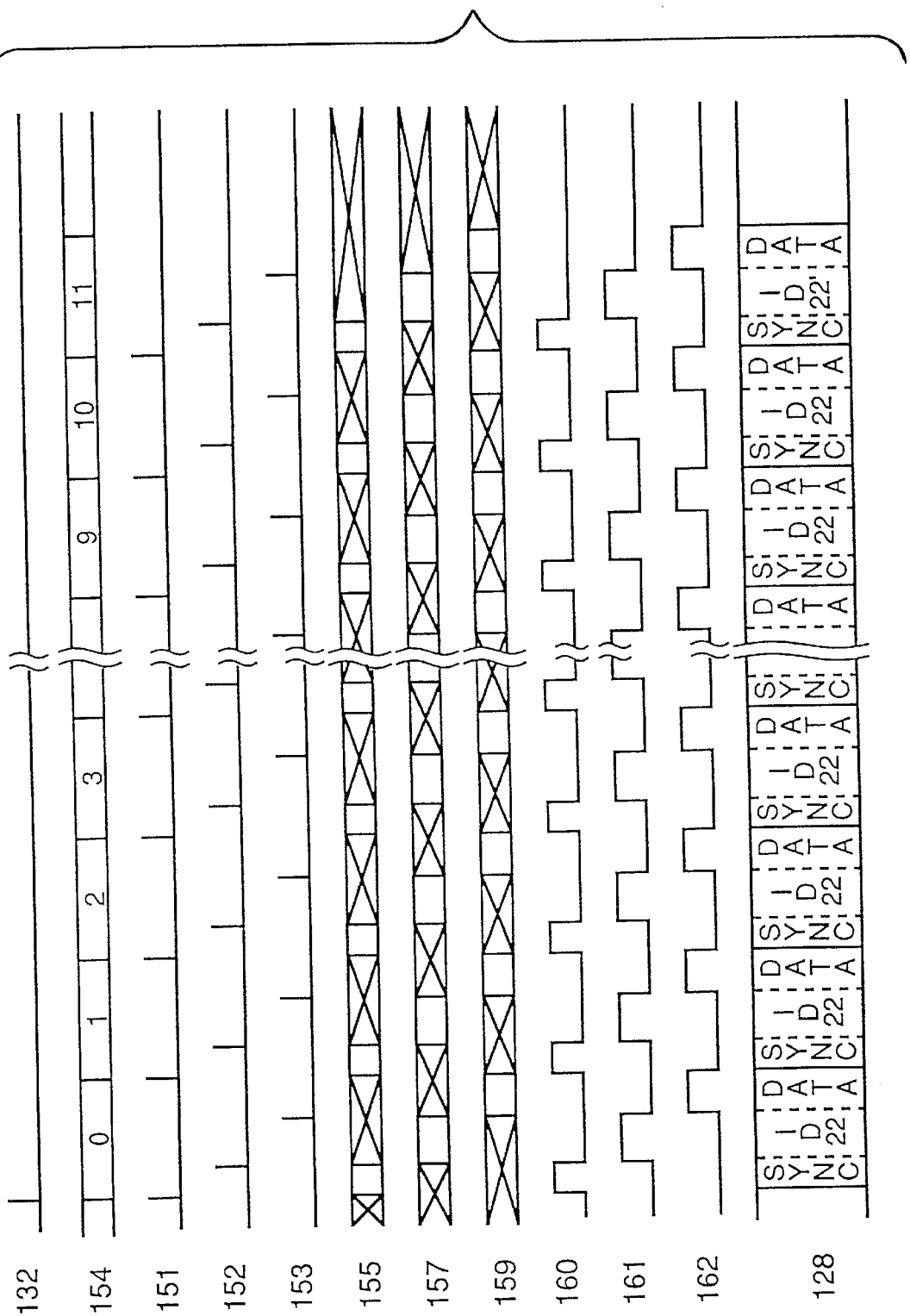
FIG. 11 is a timing chart of the operation of the subcode area generator of FIG. 10.

Referring to FIG. 10, the subcode area data generator 113 has a subcode position generator 145 which generates various timing signals in the subcode area upon receipt of the subcode trigger signal 132. The subcode position generator 145 generates a sync pattern trigger signal 151 for effecting the generation of the sync pattern, an ID trigger signal 152 for effecting the generation of the ID code and ID parity, an information data trigger signal 153 for effecting the generation of the second information data and second information data parity. Also produced from the subcode position generator 145 are control signals 160, 161 and 162 for respectively selecting a sync pattern 155, an ID code 156 followed by an ID parity 157, and a second information data 158 followed by a second information data parity 159 thereby to output the subcode area signal 128 through a multiplexer 147.

A block number generator 146 outputs a block number signal 154 indicative of the block order of the sync blocks in response to the subcode trigger signal 132. A sync pattern generator 140 generates the sync pattern 155 in response to the sync pattern trigger signal 151 as an output timing signal. An ID generator 141 generates the ID code 156 in either one of the forms shown in FIGS. 5A and 5B based on the information 121, the signal 124 of the information of the cue data and the absolute position of the tape and the block number signal 154 in response to the ID trigger signal 152.

When the block number signal 154 is between "0" representing the first sync block and "10" representing the eleventh sync block, the first ID code 22 (FIG. 5A) having the information of the cue data and the absolute position of the tape and the block number signal is generated. On the other hand, if the block number signal 154 is 11 representing the twelfth sync block, the second ID code 22' (FIG. 5B) having the TDS information of the track data structure, the tape absolute position information and the block number is generated. An ID parity adder 142 adds an ID parity to ID code 156 to generate signal 157.

A second information data generator 143 outputs the second information data 158 from the information 125 in response to the information data trigger signal 153. An information data parity adder 144 adds an information data parity to the second information data 158 thereby to form the signal 159. The subcode area generator 147, which is a multiplexer, selects one of the signals 155, 157 and 159 in response to the control signal 160, 161 and 162, thereby forming a sync pattern and outputting the subcode area signal 128.

Next, the digital data recording apparatus for recording the pattern of the data streamer shown in FIG. 7 will now be described with reference to FIGS. 17 and 18.

Figure 17:
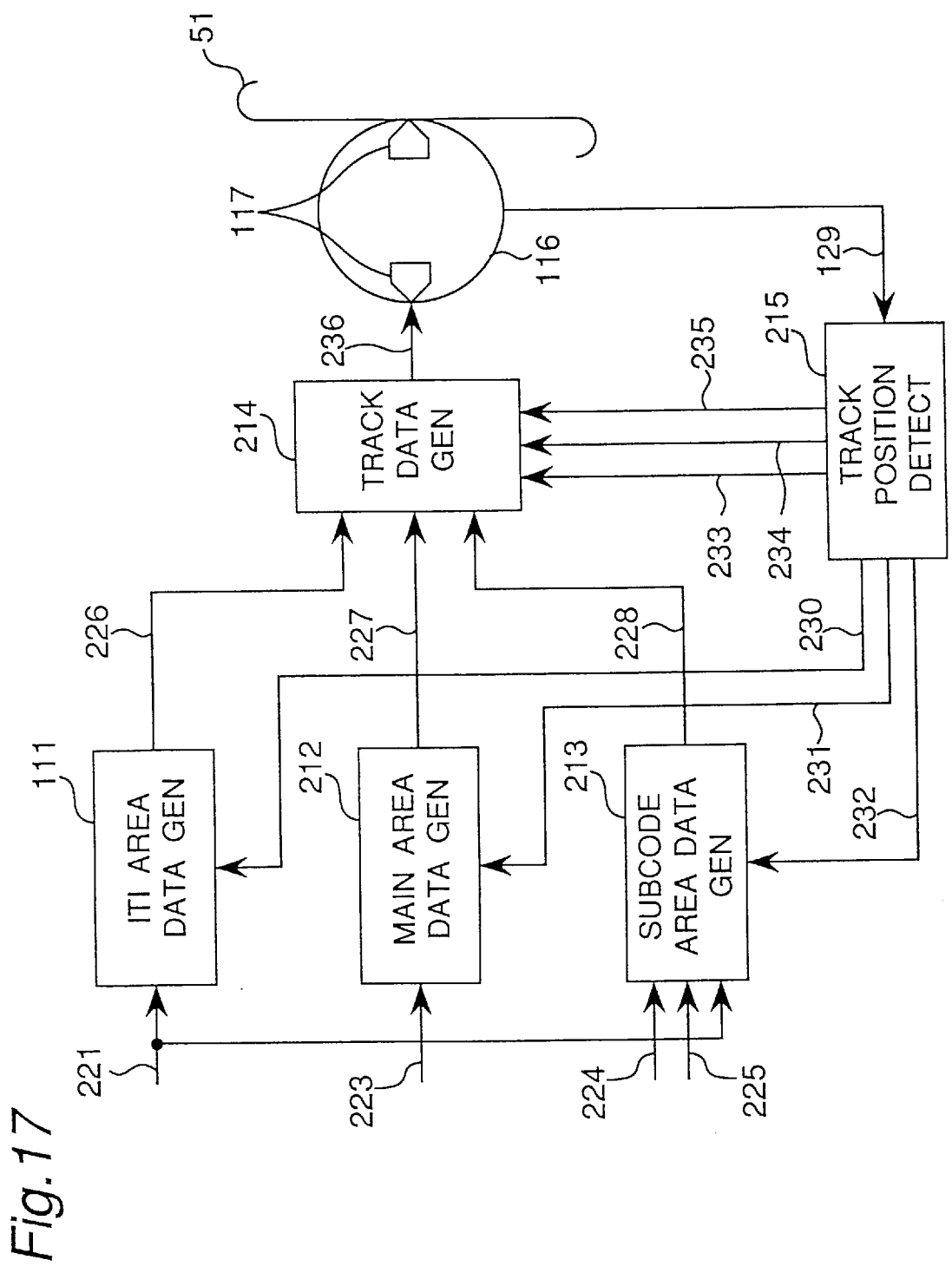
FIG. 17 is a circuit diagram of a recording apparatus of the data streamer of FIG. 3.
Figure 18:
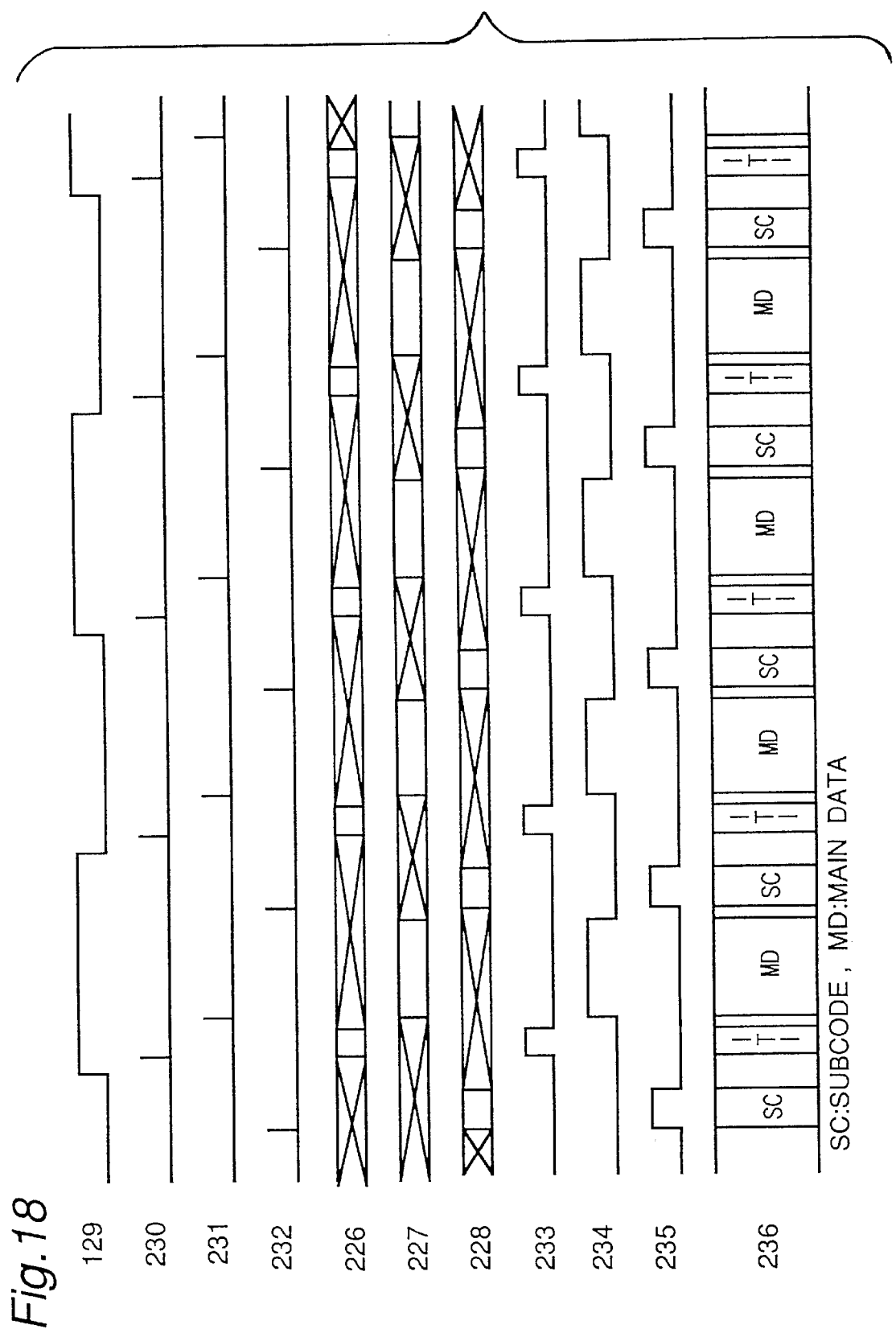
FIG. 18 is a timing chart of the operation of the recording apparatus of FIG. 17.

Referring to FIGS. 17.and 18, a track position detector 215 instructs the-timing for generating and inserting data in the track in accordance with a head position signal 129 indicating the position of the heads 117 mounted on the cylinder. The head position signal 129 is a toggle signal inverted to 0 from 1 or 1 from 0 when the head comes to a starting point of the track.

Produced from the track position detector 215 are an ITI trigger signal 230 indicating the timing to generate an ITI area data 226, a main area data trigger signal 231 instructing the timing to generate a main area data 227, and a subcode trigger signal 232 indicating the timing to generate a subcode area data 228. Also produced from detector 215 are control signals 233, 234, 235 which are fed to a track data generator 214 to select one of ITI area data 226, main area data 227 and subcode area data 228 to form a track signal 236.

An ITI area data generator 111 generates in response to ITI trigger signal 230, the ITI area data 226 based on TDS information 221 indicative of the structure of the data in the track. An main area data generator 212 generates in response to the main area data trigger signal 231, the main area data 227 based on main data signal 223. A subcode area data generator 213 generates, in response to the subcode trigger signal 232, the subcode area data 228 based on TDS information 221, composite information 224 including the cue data and the absolute position of the tape, and date information 225 including searching code and date information of the recording content.

A rotary cylinder 116 is arranged in the same manner as described above.

The subcode area data generator 213 will be discussed more in detail with reference to FIGS. 19 and 20.

Figure 19:
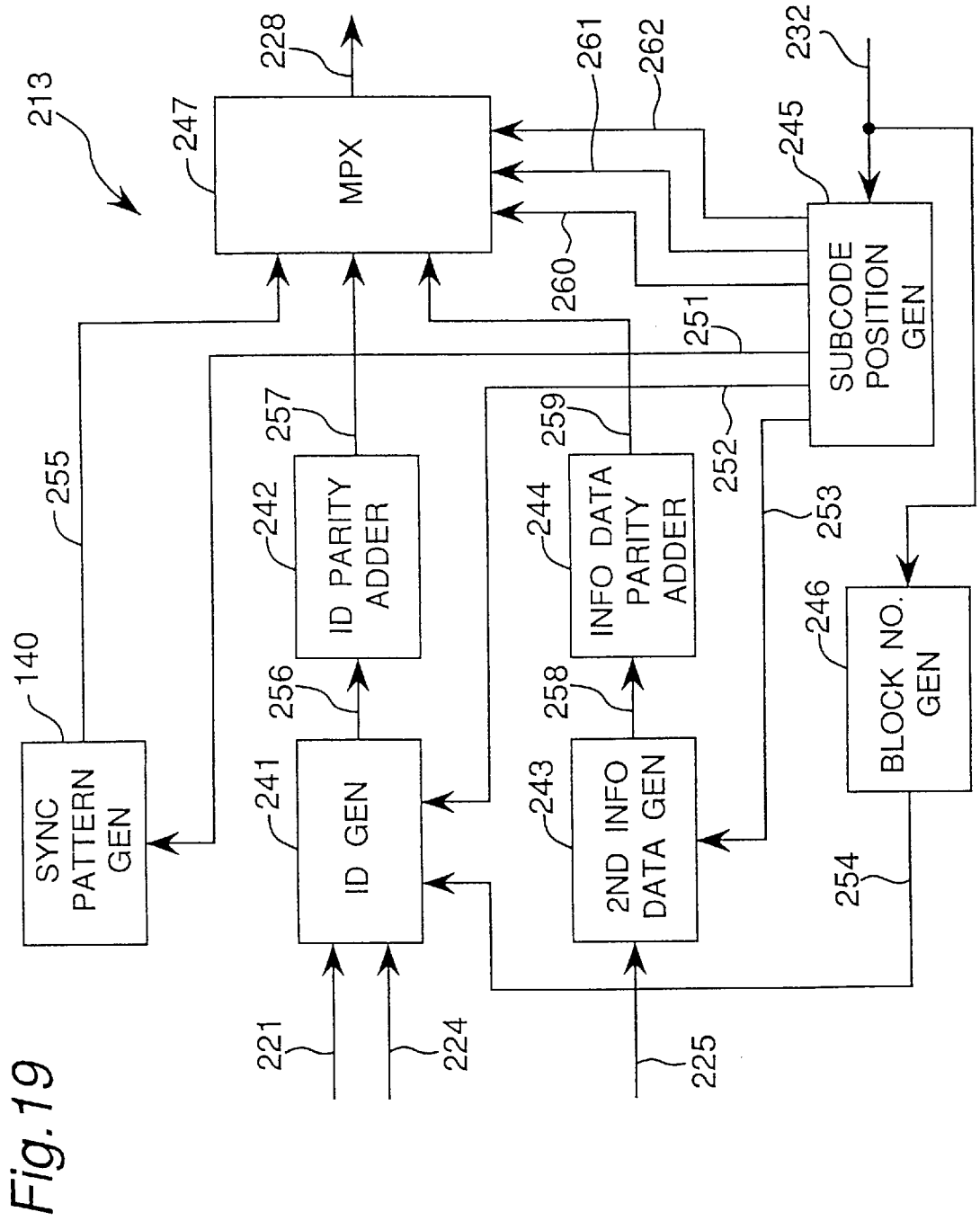
FIG. 19 is a circuit diagram of a subcode area generator in the recording apparatus of FIG. 17.
Figure 20:
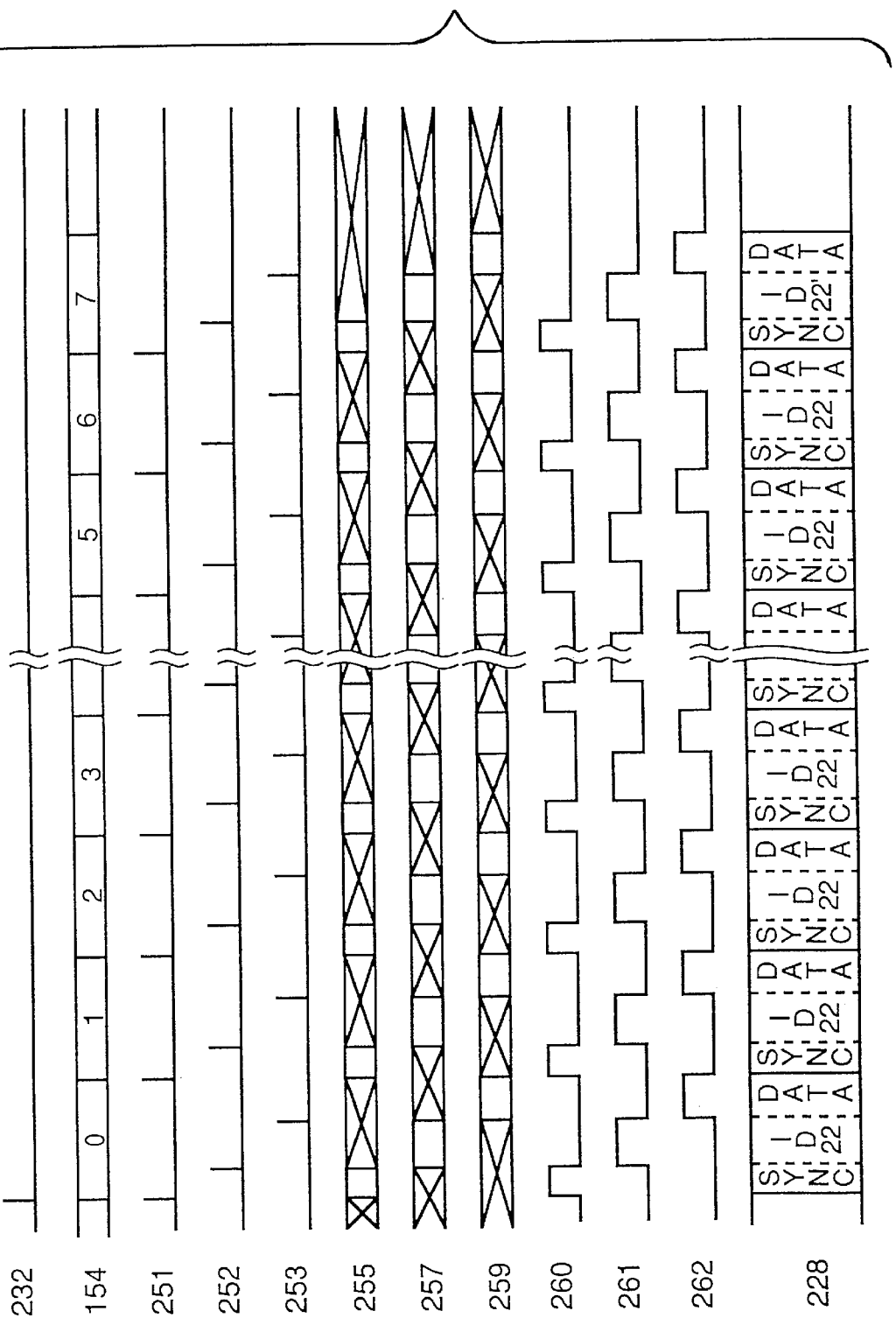
FIG. 20 is a timing chart of the operation of the subcode area generator of FIG. 19.

Referring to FIG. 19, the subcode area data is generator 213 has a subcode position generator 245 which generates various timing signals in the subcode area upon receipt of the subcode trigger signal 232. The subcode position generator 245 generates a sync pattern trigger signal 251 for effecting the generation of the sync pattern, an ID trigger signal 252 for effecting the generation of the ID code and ID parity, an information data trigger signal 253 for effecting the generation of the second information data and second information data parity. Also produced from the subcode position generator 245 are control signals 260, 261 and 262 for respectively selecting a sync pattern 255, an ID code 256 followed by an ID parity 257, and a second information data 258 followed by a second information data parity 259 thereby to output the subcode area signal 228 through a multiplexer 247.

A block number generator 246 outputs a block number signal 254 indicative of the block order of the sync blocks in response to the subcode trigger signal 232. A sync pattern generator 140 generates the sync pattern 255 in response to the sync pattern trigger signal 251 as an output timing signal. An ID generator 241 generates the ID code 256 in either one of the forms shown in FIGS. 5A and 5B based on the information 221, the signal 224 of the information of the cue data and the absolute position of the tape and the block number signal 254 in response to the ID trigger signal 252.

When the block number signal 2S4 is between "0" representing the first sync block and "6" representing the seventh sync block, the first ID code 22 (FIG. 5A) having the information of the cue data and the absolute position of the tape and the block number signal is generated. On the other hand, if the block number signal 254 is 7 representing the eighth sync block, the second ID code 22' (FIG. 5B) having the TDS information of the track data structure, the tape absolute position information and the block number is generated. An ID parity adder 242 adds an ID parity to ID code 256 to generate signal 257.

A second information data generator 243 outputs the second information data 258 from the information 225 in response to the information data trigger signal 253. An information data parity adder 244 adds an information data parity to the second information data 258 thereby to form the signal 259. The subcode area generator 247, which is a multiplexer, selects one of the signals 255, 257 and 259 in response to the control signal 260, 261 and 262, thereby forming a sync pattern and outputting the subcode area signal 228.

In the above described embodiment, the recording pattern is formed by the circuit of FIG. 8 or 19, but any other circuit may be employed so long as it can generate the same pattern as the recording pattern. Moreover, a part of the circuit of FIG. 8 or 19, or the whole circuit may be realized by software.

Since the ITI area 2 is disposed at the same position in any of the track patterns of FIGS. 6 and 7, it is possible for both the digital VCR and the data streamer to detect the ITI area of either track pattern and accordingly recognize the structure of the data and the content of the data in the track. That is, whether it is the digital VCR or the data streamer and whichever track pattern is received, an erroneous operation at the reproducing time of data is prevented. In the meantime, if an apparatus functions both as the digital VCR and the data streamer, any of the track patterns shown in FIGS. 6 and 7 can be normally reproduced since the structure and content of data in the track can be recognized from the ITI area.

Figure 12:
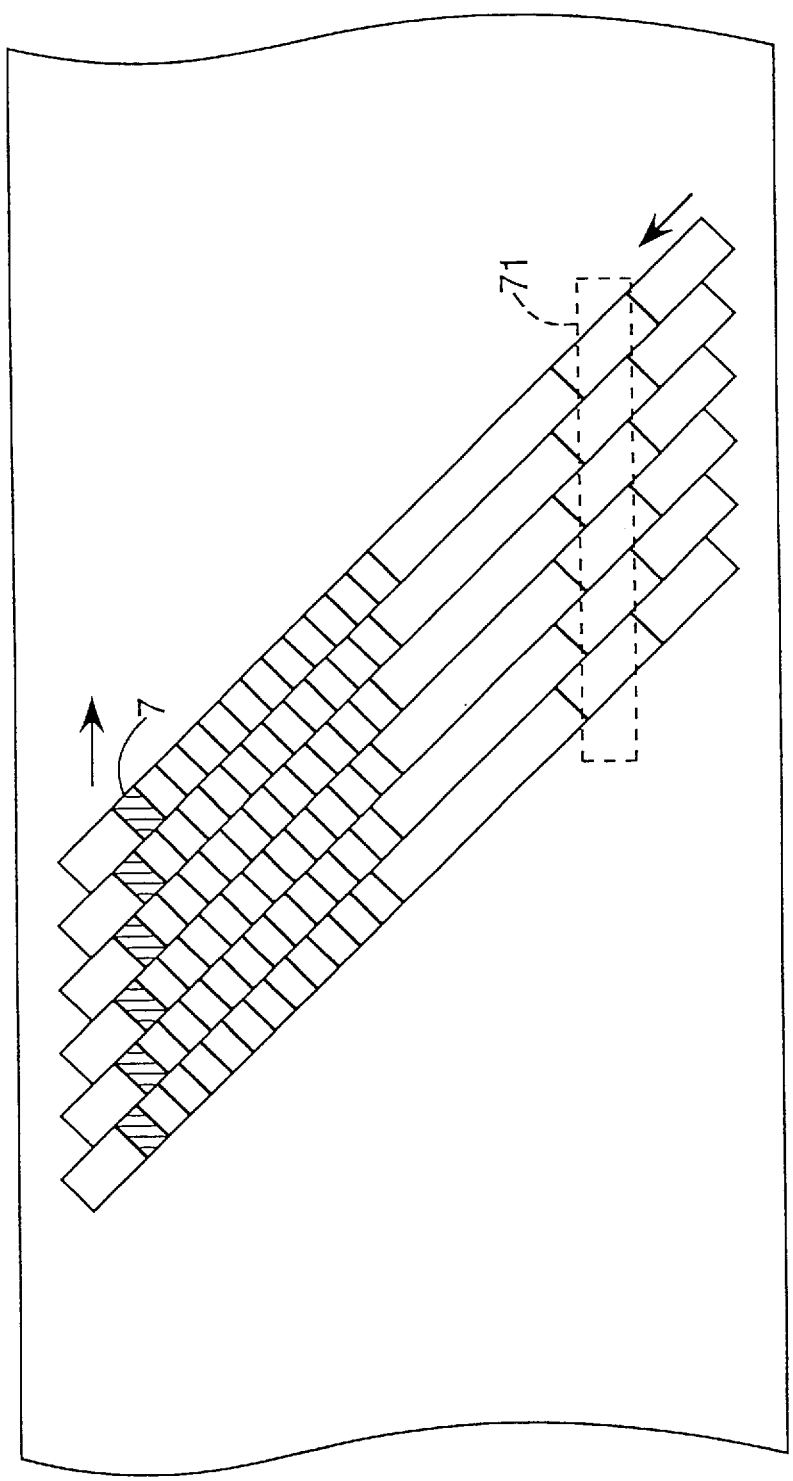
FIG. 12 is a diagram of a tape pattern of the digital VCR of the present invention (when the tape is damaged)
Figure 13:
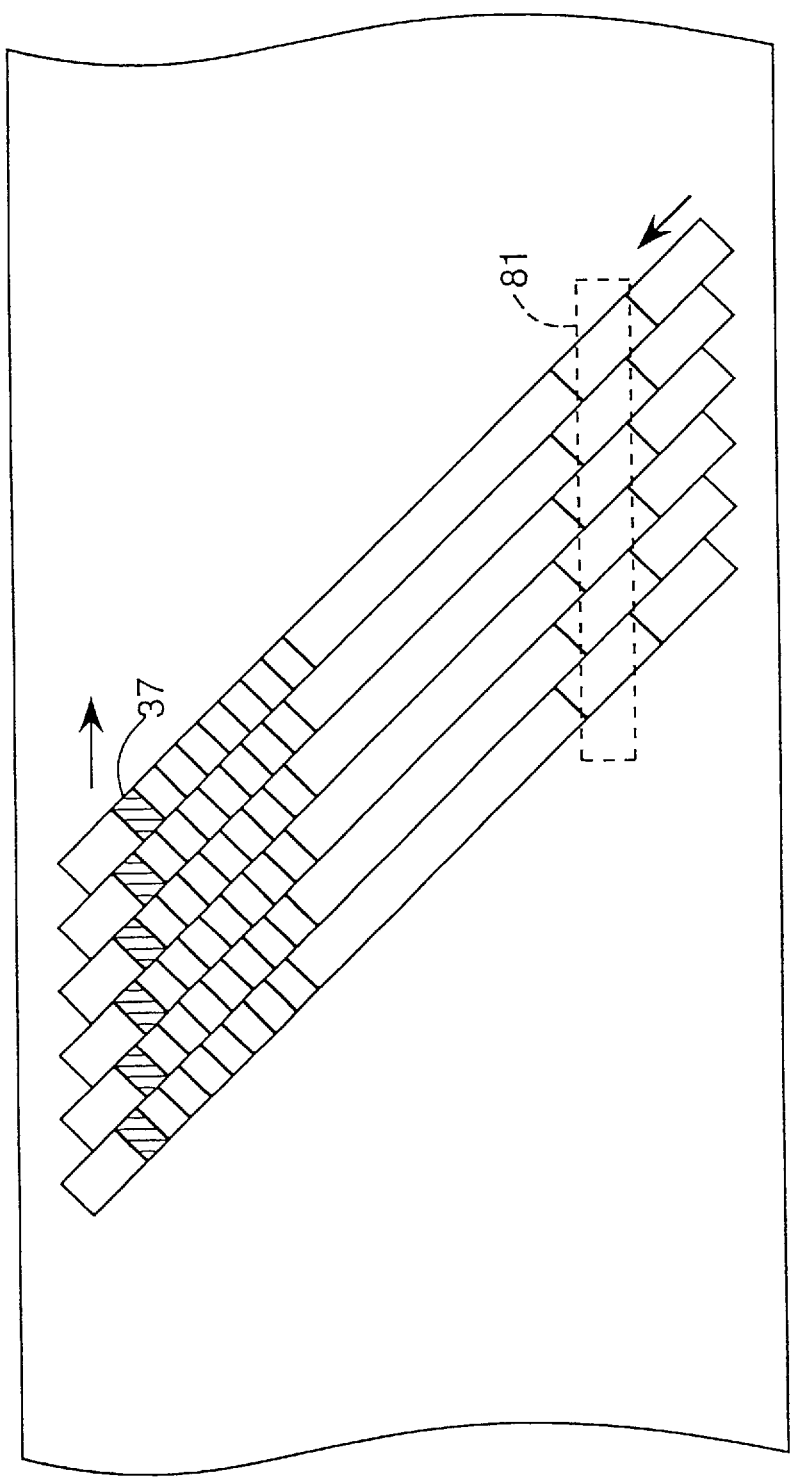
FIG. 13 is a diagram of a tape pattern of the data streamer of the present invention (when the tape is damaged)

As shown in FIGS. 12 and 13, in the event that the ITI area is damaged, such as by scratch, at positions 71 and 81 in the running direction of the tape, the ITI area would not be correctly detected and the structure and content of data, particularly the TDS information, in the track might not be correctly read. However, according to the present invention, since the TDS information is also recorded in the final sync block 7 or 37 in the subcode area, the TDS information can be properly read from such a final sync block, as described below.

Here, the ITI area and the subcode area in the track are generally stated as the first and second signal areas, respectively.

Figure 14:
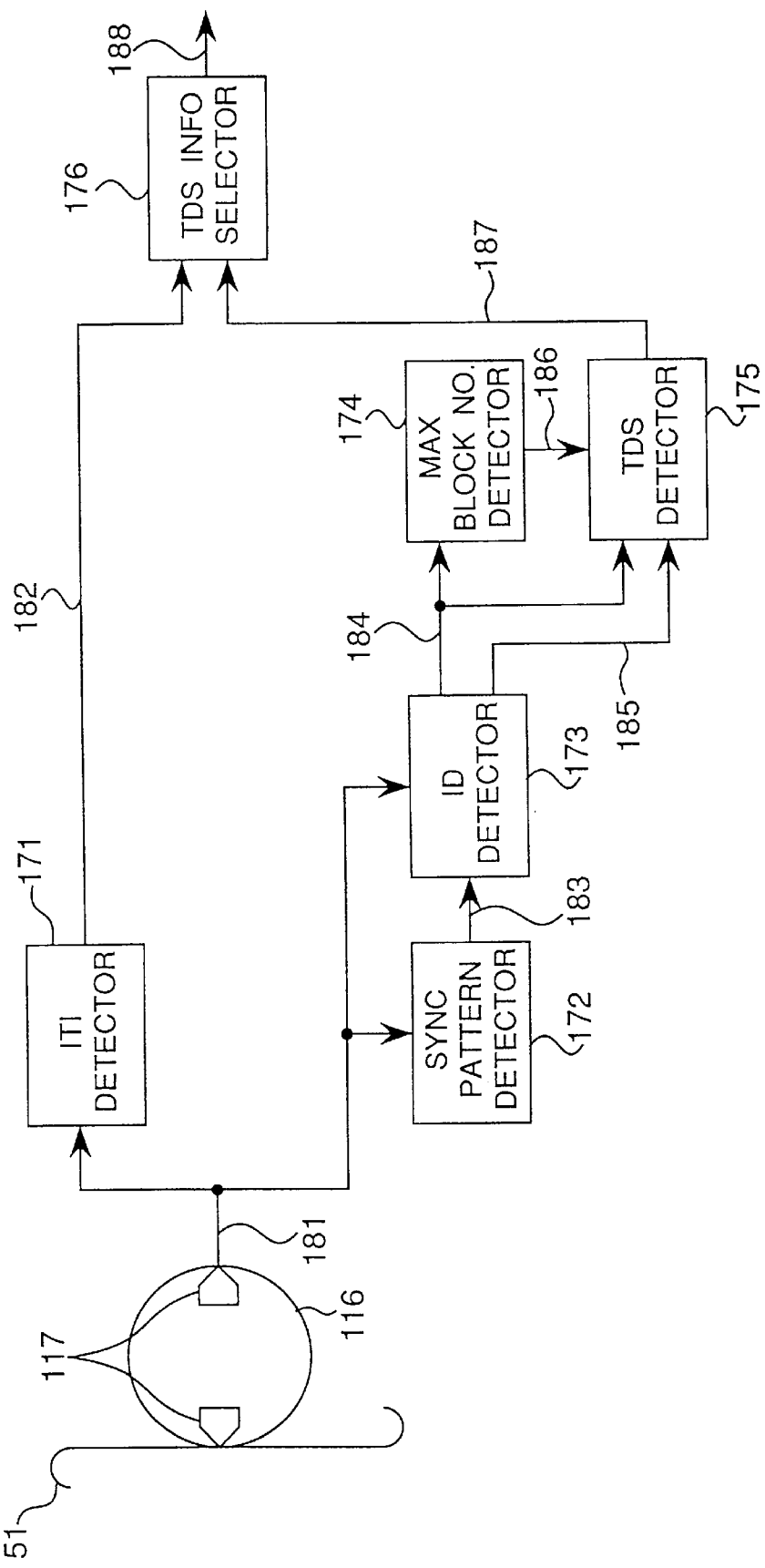
FIG. 14 is a circuit diagram of a digital data reproducing apparatus in an embodiment of the present invention.

Referring to FIG. 14, a digital data reproducing apparatus for detecting the TDS information from a track is shown. In FIG. 14, 171 is an ITI detector which detects the TDS information data from a reproduced data 181, and outputs the detected TDS information 182 together with other track data. The TDS information 182 produced from the ITI detector 171 is referred to as a regular TDS information 182 in contrast to a backup TDS information 187 which would be produced from TDS detector 175 as described below.

A sync pattern detector 172 detects a sync pattern from the reproduced data 181 from the recording/reproducing heads 117 and outputs a sync pattern detecting signal 183. An ID code detector 173, detecting an ID code and an ID parity within the reproduced data 181 through the sync pattern detecting signal 183, generates a correct ID code block number signal 184 and information 185 of the cue data or structure of data. The cue data information is formed of most significant 4 bits of the ID code. A maximum block number detector (or special sync block detection means) 174 detects the maximum value of the block number 184, and outputs the maximum block number signal 186 representing the block number of the final (or special) sync block. In the case of the data format for the digital VCR the maximum block number which is given to the final sync block would be twelve, and in the case of the data format for the data streamer the maximum block number which is given to the final sync block would be eight. A TDS information detector 175 detects the TDS information from the final (or special) sync block. The TDS information detected by the detector 175 is produced as a backup TDS information 187.

A TDS information selector 176 receives the regular TDS information 182 and the backup TDS information 187, and produces a selected TDS information 188 in a manner described below.

When the selector 176 detects the regular TDS information 182 as a proper TDS information, the selector 176 sends out the regular TDS information 182 as the selected TDS information. However, when the selector 176 fails to detect the regular TDS information 182, the selector 176 outputs the backup information 187 as the selected TDS information 188.

Figure 15:
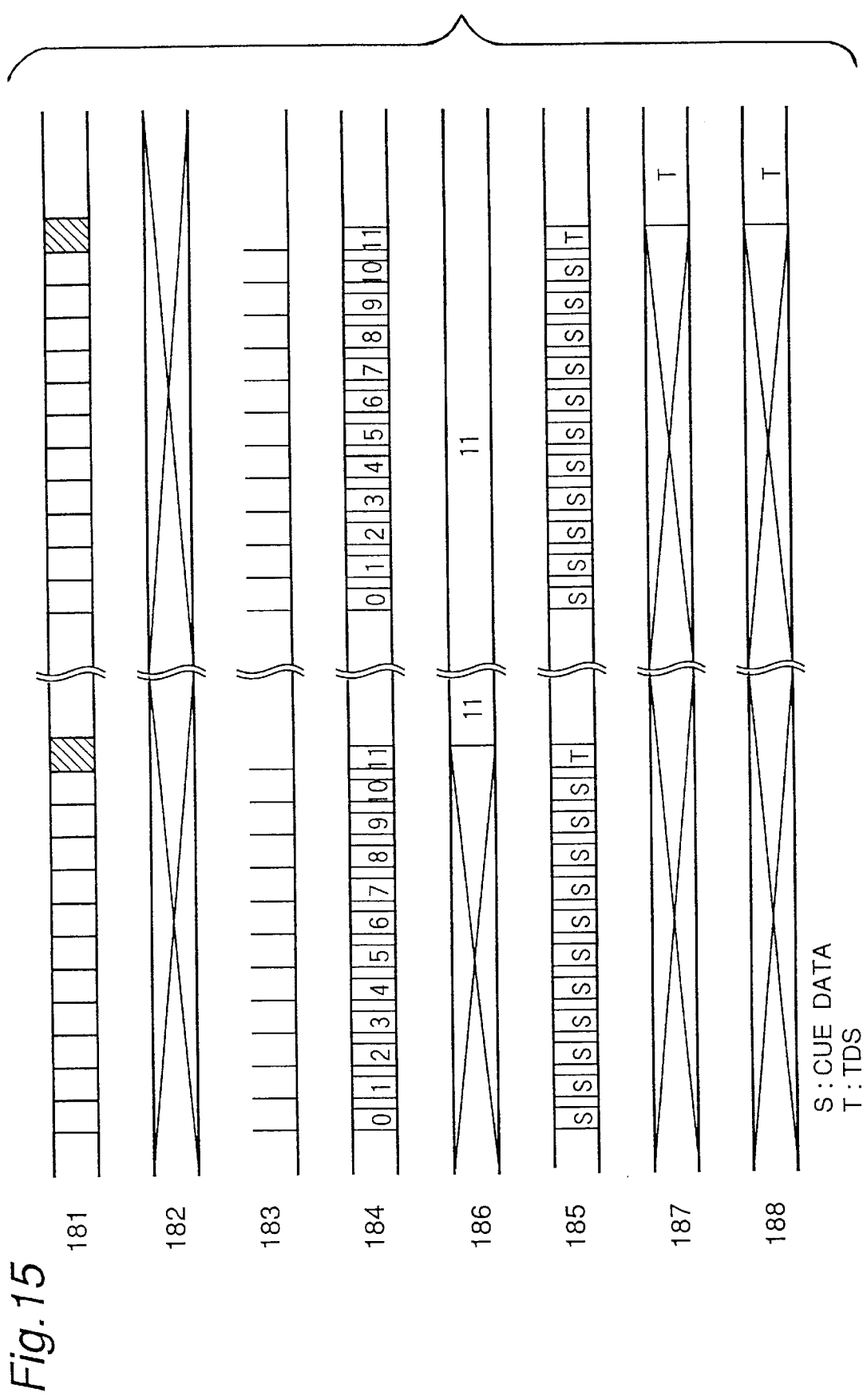
FIG. 15 is a timing chart of the operation of the digital data reproducing apparatus of FIG. 15.
Figure 16:
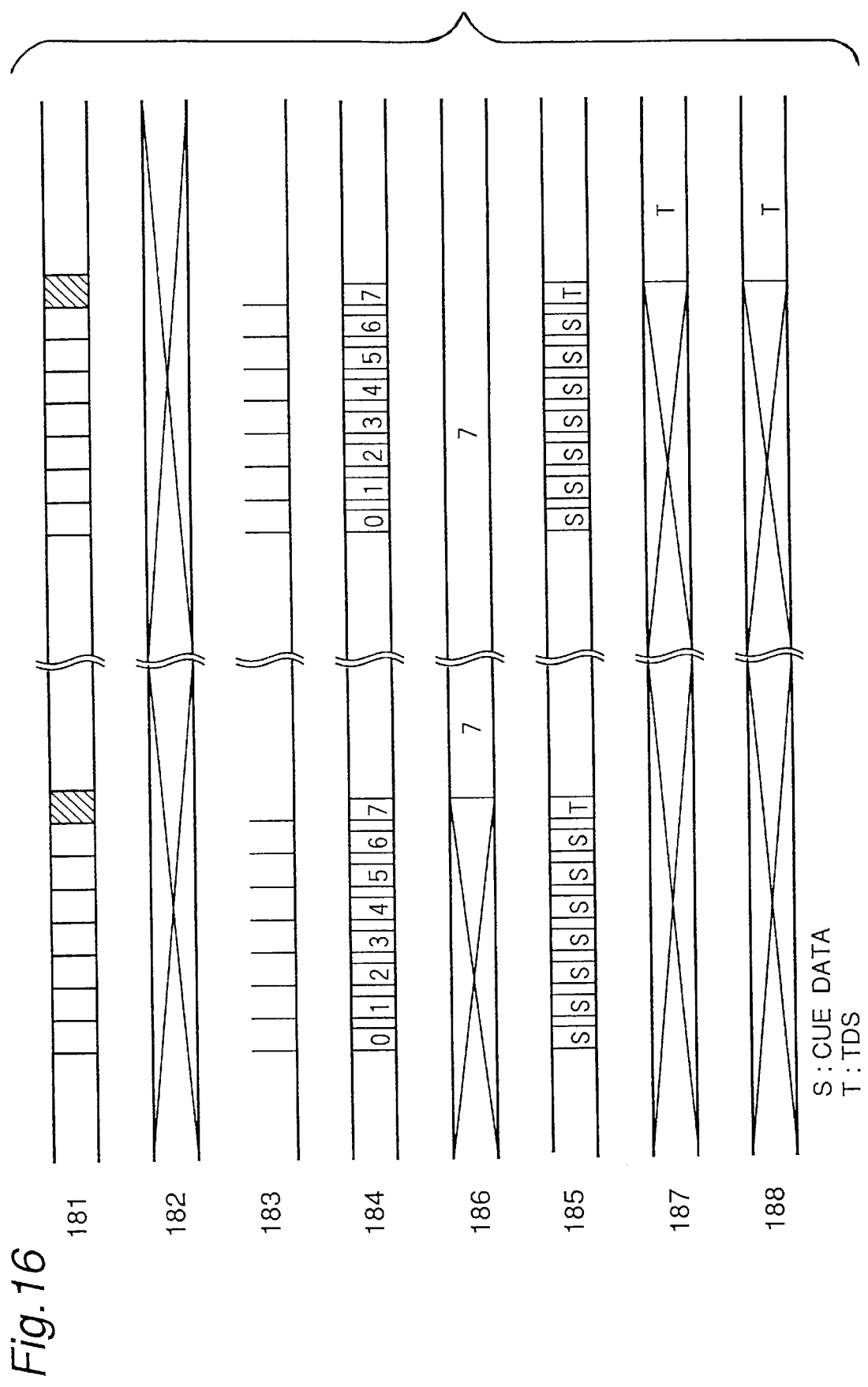
FIG. 16 is a timing chart of the operation of a digital data reproducing apparatus in a different embodiment of the present invention.

The operation for reproducing the tape pattern of FIG. 12 recorded by the digital VCR is shown in FIG. 15, and that of FIG. 13 in the case of the data streamer is shown in FIG. 16. In any case, because of the presence of damages 71 or 81 in the ITI area 2 in the running direction of the tape, the first information 182 is impossible to read. Therefore, the TDS information is identified from the backup TDS information 187 detected from the final sync block having the maximum block number 184. Even if the ITI area cannot be detected normally due to damages in the running direction of the tape, the TDS information can be properly read by the use of the backup TDS information. Thus, the content of data in the track can be recognized normally.

Although the maximum block number detector 174 detects the maximum block number at a single scan of the track, it may be so arranged as to detect the maximum block number after a predetermined number of scans of the tracks, and to select the largest detected maximum block number. This will avoid an erroneous detection.

The signal area including the information of the structure of data of the track is not necessarily limited to the subcode area at all so long as the sync blocks of the same sync pattern and the same structure of ID codes and ID parities are used. Further, the signal area including the information of the structure of data of the track is not required to be limited to the ID code area if it is coded and included at a specific position separated from the sync pattern of the sync blocks. Although the TDS information showing the track data structure is included in the ID code of the final sync block of the signal area, any other sync block can be used, as long as the position of such a sync block is specified. In this case, instead of the maximum block number detector 174, a specific block number detector can be used for detecting a predetermined block number.

Moreover, the TDS information may be disposed in a plurality of synchronous blocks, other than in one sync block in each signal area. Because of the arrangement that the TDS information is included in the last sync block of the subcode area in the present invention, the last sync block is detected by detecting the maximum block number of the subcode area as described with reference to the digital data reproducing apparatus of FIG. 14. If the TDS information is included in the sync block at a specific position from the start of the subcode area, it is possible to detect the TDS information only by detecting the block number. Similar to the digital data recording apparatus, a part of the circuit or the whole circuit of the digital data reproducing apparatus may be realized by software.

As described above, since the signal area consisting of sync blocks of the same sync pattern and the same structure of ID codes and ID parities is always provided in each track pattern, and the TDS information indicating the track data structure is included in the ID code area of the final sync block of the signal area, the detecting accuracy of the TDS information is enhanced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for recording digital data on a recording medium in a form of tracks aligned parallelly on said recording medium, each of said tracks having a track data format selected from at least a first and second track data formats, and each track having a first signal area for storing track format information and a second signal area for storing a plurality of sync blocks, each of said plurality of sync blocks including a sync pattern, an ID code and information data, said method comprising:

inserting, in said first signal area, regular TDS information indicating a track data format of a track in which said first signal area is positioned; and inserting, into said ID code of a predetermined one of said plurality of sync blocks, backup TDS information, wherein said regular TDS information and said backup TDS information are the same information, wherein said ID code of said first track data format and said ID code of said second track data format have the same data structure, and wherein said first track data format includes a first predetermined number of sync blocks when said first track data format is recorded, and said second track data format includes a second predetermined number of sync blocks when said second track data format is recorded.

2. A recording method as claimed in claim 1, wherein said backup TDS information is inserted in a final sync block.

3. A recording method as claimed in claim 1, wherein each of said plurality of sync blocks comprises: a sync pattern showing a starting point of said sync block; said ID code comprising first information data and data indicative of an order of said sync block; an ID parity for detecting an error in said ID code; second information data; and an information data parity for detecting an error in said second information data.

4. A recording method as claimed in claim 3, wherein said backup TDS information is inserted into said ID code as said first information data.

5. The recording method according to claim 1, wherein said sync pattern of said first track data format and said sync pattern of said second track data format are identical.

6. The recording method according to claim 1, wherein said information data of said first track data format and said information data of said second track data format have different data structures.

7. The recording method according to claim 1, wherein said first predetermined number is different than said second predetermined number.

8. A reproducing method for reproducing digital data from a recording medium by reading tracks from said recording medium, each of said tracks having a track data format selected from at least a first and second track data formats, each track having a first signal area containing regular TDS information indicating a track data format of the track in which said first signal area is positioned, and a second signal area containing a plurality of sync blocks, wherein each of said plurality of sync blocks includes a sync pattern, an ID code and information data, and wherein a predetermined one of said plurality of sync blocks includes backup TDS information having the same information as said regular TDS information, and wherein said ID code of said first track data format and said ID code of said second track data format have the same data structure, and wherein said first track data format includes a first predetermined number of sync blocks when said first track data is reproduced, and said second track data format includes a second predetermined number of sync blocks when said second track data is reproduced, said method comprising:

detecting said regular TDS information from said first signal area;

detecting said backup TDS information from said ID code in said predetermined sync block of said second signal area; and selecting one of said regular TDS information and said backup TDS information.

9. A reproducing method as claimed in claim 8, wherein said selecting step comprises:

selecting said regular TDS information when said regular TDS information is detected; and selecting said backup TDS information when said regular TDS information is not detected.

10. The reproducing method according to claim 8, wherein said sync pattern of said first track data format and said sync pattern of said second track data format are identical.

11. The reproducing method according to claim 8, wherein said information data of said first track data format and said information data of said second track data format have different data structures.

12. The reproducing method according to claim 8, wherein said first predetermined number is different than said second predetermined number.

13. An apparatus for recording digital data on a recording medium in a form of tracks aligned parallelly on said recording medium, each of said tracks having a track data format selected from at least a first and second track data formats, and each track having a first signal area for storing track format information and a second signal area for storing a plurality of sync blocks, each of said plurality of sync blocks comprising a sync pattern, an ID code and information data, said apparatus comprising:

first inserting means for inserting, in said first signal area, regular TDS information indicating a track data format of a track in which said first signal area is positioned; and second inserting means for inserting, into said ID code of a predetermined one of said plurality of sync blocks, backup TDS information, wherein said regular TDS information and said backup TDS information are identical, and wherein said ID code of said first track data format and that of said second track data format have the same data structure, and wherein said first track data format includes of a first predetermined number of sync blocks when said first track data format is recorded, and said second track data format includes a second predetermined number of sync blocks when said second track data format is recorded.

14. A recording apparatus as claimed in claim 13, wherein said backup TDS information is inserted in the final sync block.

15. A recording apparatus as claimed in claim 13, wherein said second inserting means comprises:

a sync pattern generator for generating a sync pattern showing a starting point of said sync block;

an ID code generator for generating said ID code comprising first information data and data indicative of an order of said sync block;

an ID parity generator for generating an ID parity for detecting an error in said ID code;

a second information data generator for generating a second information data;

an information data parity generator for generating an information data parity for detecting an error in said second information data; and a multiplexer for aligning said sync pattern, said ID code followed by said ID parity, and said second information data followed by said information data parity in a predetermined order.

16. A recording apparatus as claimed in claim 15, wherein said backup TDS information is inserted into said ID code as said first information data.

17. The recording apparatus according to claim 13, wherein said sync pattern of said first track data format and said sync pattern of said second track data format are identical.

18. The recording apparatus according to claim 13, wherein said information data of said first track data format and said information data of said second track data format have different data structures.

19. The recording apparatus according to claim 13, wherein said first predetermined number is different than said second predetermined number.

20. An apparatus for reproducing digital data from a recording medium by reading tracks from said recording medium, each of said tracks having a track data format selected from at least a first and second track data formats, and each track having a first signal area comprising regular TDS information indicating a track data format of a track in which said first signal area is positioned, and a second signal area comprising a plurality of sync blocks, wherein each of said plurality of sync blocks includes a sync pattern, an ID code and information data, and wherein a predetermined one of said plurality of sync blocks includes backup TDS information having the same information as said regular TDS information, and wherein said ID code of said first track data format and said ID code of said second track data format have the same data structure, and wherein said first track data format includes a first predetermined number of sync blocks when said first track data is reproduced, and said second track data format includes a second predetermined number of sync blocks when said second track data is reproduced, said apparatus comprising:

first detecting means for detecting said regular TDS information from said first signal area;

second determining means for detecting said backup TDS information from said ID code in said predetermined sync block of said second signal area; and selecting means for selecting one of said regular TDS information and said backup TDS information.

21. A reproducing apparatus as claimed in claim 20, wherein said selecting means selects said regular TDS information when said regular TDS information is detected, and selects said backup TDS information when said regular TDS information is not detected.

22. A reproducing apparatus as claimed in claim 21, wherein said second detecting means comprises:

sync block detecting means for detecting said sync blocks;

special sync block selection means for selecting said predetermined sync block in which said backup TDS information is carried; and extraction means for extracting said backup TDS information from said predetermined sync block.

23. A reproducing apparatus as claimed in claim 22, wherein said predetermined sync block is a final sync block of said plurality of sync blocks, and wherein said predetermined sync block selection means comprises a final sync block detection means for detecting the final sync block.

24. A reproducing apparatus as claimed in claim 21, further comprising an ID code detector 173 for detecting an ID code from each sync block.

25. The reproducing apparatus according to claim 20, wherein said sync pattern of said first track data format and said sync pattern of said second track data format are identical.

26. The reproducing apparatus according to claims 20, wherein said information data of said first track data format and said information data of said second track data format have different data structures.

27. The reproducing apparatus according to claim 20, wherein said first predetermined number is different than said second predetermined number.

\* \* \* \* \*

UNITED STATES PATENT AND TRADEMARK OFFICE
CERTIFICATE OF CORRECTION

PATENT NO. : 5,844,739
DATED : December 1, 1998
INVENTOR(S) : T. MIZUSHIMA et al.

It is certified that error appears in the above-identified patent and that said Letters Patent is hereby corrected as shown below:

At column 14, line 5 (claim 26, line 1) of the printed patent, "claims" should be ---claim---.

Signed and Sealed this

Fourteenth Day of March, 2000

Attest:

Q. TODD DICKINSON

Attesting Officer

Commissioner of Patents and Trademarks